United States Patent
Boelter et al.

(10) Patent No.: US 10,055,784 B1
(45) Date of Patent: Aug. 21, 2018

(54) IN-STREAM PIVOTING SEARCH RESULTS

(71) Applicant: Amazon Technologies, Inc., Seattle, WA (US)

(72) Inventors: Joshua Joel Boelter, Seattle, WA (US); Kristopher William Bell, Seattle, WA (US); Wesley Scott Lauka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 802 days.

(21) Appl. No.: 14/525,914

(22) Filed: Oct. 28, 2014

(51) Int. Cl.
*G06Q 30/00* (2012.01)
*G06Q 30/06* (2012.01)
*G06F 17/30* (2006.01)

(52) U.S. Cl.
CPC ... *G06Q 30/0641* (2013.01); *G06F 17/30867* (2013.01); *G06Q 30/0631* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 9,189,811 B1* | 11/2015 | Bhosle | G06Q 30/0631 |
| 2006/0020523 A1* | 1/2006 | Song | G06Q 30/0256 |
| | | | 705/14.54 |
| 2010/0064254 A1* | 3/2010 | Atsmon | G06F 17/30247 |
| | | | 715/810 |
| 2013/0031506 A1* | 1/2013 | Diaz | G06F 17/3087 |
| | | | 715/781 |
| 2013/0104063 A1* | 4/2013 | Legris | G06F 3/0484 |
| | | | 715/765 |
| 2014/0032311 A1* | 1/2014 | Cramer | G06F 17/30702 |
| | | | 705/14.45 |

OTHER PUBLICATIONS

Alhenshiri, Anwar, Augmenting the Visual Presentation of Web Search Results, Jul. 1, 2010, 2010 Fifth International Conference on Digital Information Management, pp. 101-107 (Year: 2010).*

* cited by examiner

*Primary Examiner* — William J Allen
*Assistant Examiner* — Timothy J Kang
(74) *Attorney, Agent, or Firm* — Athorus, PLLC

(57) ABSTRACT

When a search query is provided to a search engine, and search results obtained from the search engine in response to the search query are displayed in a stream or list on a mobile device, an interaction with one or more of the search results causes information regarding the search result to be displayed within the stream or list, thereby creating a visual history of the user's interactions with the search results. Additionally, the items following a search result with which the user has interacted may be reordered based on the attributes of the search result, the user, or any other relevant factor.

19 Claims, 15 Drawing Sheets

IN-STREAM PIVOTING SEARCH RESULTS

BACKGROUND

Computer users may access one or more search engines in order to retrieve data from one or more dedicated databases or data stores, or from the Internet at large, using applications such as browsers. A user may provide a search query comprised of one or more keywords to an application that is configured to access a search engine, and may receive one or more search results identified based on the search query and any other relevant factors, e.g., one or more attributes of the user, or a context in which the search query was provided. The search results may be ranked on any basis, and may be displayed in a bare form, e.g., without any additional information or data, or in a dynamic manner that includes one or more hyperlinks, site links or sets of accompanying information or data. Search engines may return search results of a general nature, or search results that are specifically targeted for one or more purposes. For example, a search engine may be associated with an online marketplace, and may be configured to return lists of information or data regarding relevant items that are made available at the online marketplace (e.g., goods, products, services or information of any type or form) in response to a search query.

Most applications that are configured to receive search queries from users and provide such queries to a search engine are also configured to display search results in a serial manner, ranked top to bottom, with each of the search results bearing some relation to the search query and, alternatively, to the user or the context in which the search query was provided. When the user selects a hyperlink or other linked element associated with one of the search results, the applications are configured to display one or more pages of information or data regarding the selected search result in the same window or interface at which the search query was entered, or in one or more new windows or interfaces. The user may then access, view or manipulate the information or data regarding the selected search result in such pages, or select one or more other linked elements within such pages, and one or more additional pages of information or data regarding the selected linked elements may be displayed in the same window or interface, or in one or more new windows or interfaces. If the user wishes to return to or otherwise access previously viewed information or data, he or she must backtrack through viewed pages, e.g., by a "back" button on a browser or other application, or transition from one window or interface to another to access the other pages on which such information or data is provided.

In this regard, search engines, and most applications that are configured to access such engines (e.g., general-purpose browsers or other special-purpose applications), are effective in presenting search results to users and enabling such users to navigate through such results, or information relating to such results, when a user knows precisely what he or she is searching for, or when no further information or data is required in addition to the search results. However, when a user desires to browse through multiple results, or to make searching or browsing decisions based on a variety of information or data obtained from multiple searches, or multiple sources, applications for displaying search results are particularly unhelpful, as a user thereof must access multiple pages, windows or interfaces in order to review and evaluate the different results, or the information obtained thereby. Unfortunately, information or data obtained after reviewing search results cannot currently be presented with or among such search results. This problem is particularly acute on mobile devices, such as smartphones or tablet computers, which have screens of limited size and buttons or interactive features in limited numbers and with limited functionality.

DETAILED DESCRIPTION

As is set forth in greater detail below, the present disclosure is directed to providing search results, and information or data regarding such search results, in a common stream that is modified or otherwise pivots in response to one or more interactions that are received from a user who is viewing the search results. More specifically, when a user who is viewing a plurality of results identified in response to a search query selects an interactive feature or linked element associated with a first one of the results, information or data regarding the selected feature or element is displayed in line with the results, e.g., within the stream of the results, such as within a frame including the selected feature or element, or immediately following the selected feature or element. In this regard, a record of the user's search and/or viewing activity is shown within the stream of the results on the display of his or her computer device. If a user selects another interactive feature or linked element within the stream, e.g., an interactive feature or linked element associated with a second one of the results, or an interactive feature or linked element associated with information or data displayed upon the selection of the feature or element associated with the first one of the results, the information or data displayed within the stream following the selection of the feature or element may remain there or be contracted, and the new information or data regarding the other selected interactive feature or linked element may also be added to the stream. Therefore, a stream of information or data shown on a display of a user's device may include not only the results of the original search query but also any information or data that the user requested based on such results, and represents a complete record of the user's activity after requesting the results.

Figure 1A:
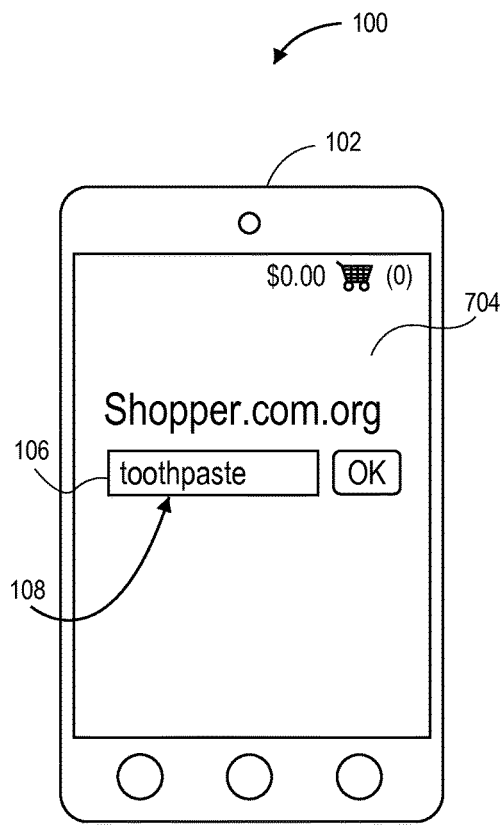
FIGS. 1A through 1E are views of one system for displaying in-stream pivoting search results in accordance with embodiments of the present disclosure.
Figure 1B:
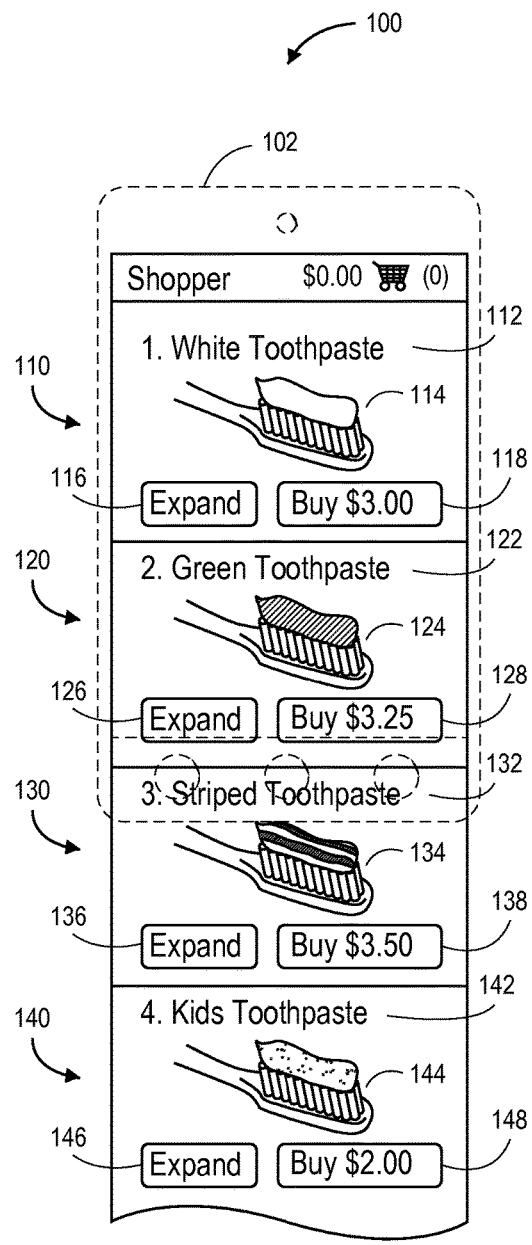

Referring to FIGS. 1A through 1E, a system 100 for displaying in-stream pivoting search results is shown. As is shown in FIG. 1A, the system 100 includes a mobile device 102 having a search box 106 into which a search term 108 (viz., toothpaste) is entered. As is shown in FIG. 1B, a stream of a plurality of items 110, 120, 130, 140 relating to the search term 108 are shown, e.g., various types of toothpaste, with information regarding some of the items 110, 120, 130, 140 appearing on a screen of the mobile device 102. The items 110, 120, 130, 140 are displayed in an order that may be defined on any basis, including but not limited to a relationship of each of the items 110, 120, 130, 140 with the search term 108, as well as any relevant information or data (e.g., metadata) regarding the user or a context in which the search term 108 was entered. Each of the items 110, 120, 130, 140 shown in the stream includes a name or title 112, 122, 132, 142 and an image 114, 124, 134, 144 of the item 110, 120, 130, 140, as well as a selectable interactive feature 116, 126, 136, 146 for obtaining additional information regarding the item 110, 120, 130, 140 and a selectable interactive feature 118, 128, 138, 148 for executing a purchase of the item 110, 120, 130, 140.

Figure 1C:
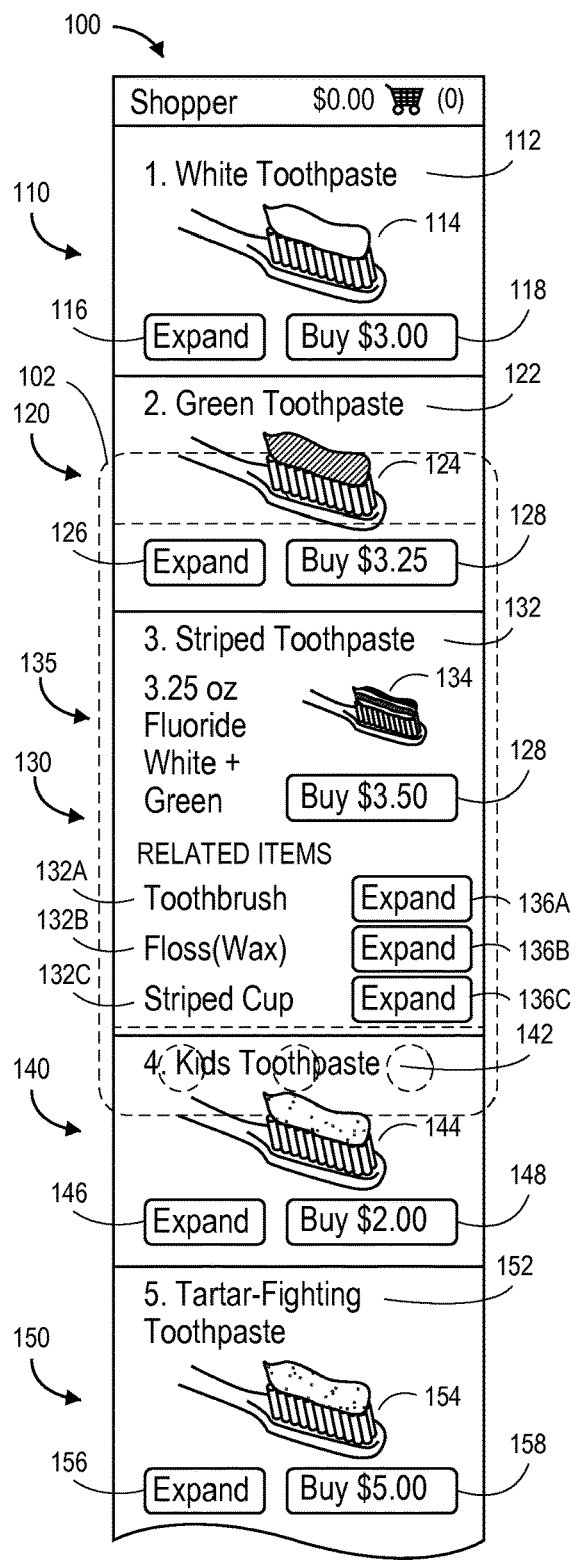

As is discussed above, a selection of an interactive feature or linked element associated with one of the items 110, 120, 130, 140 in the stream may cause additional information regarding the associated one of the items 110, 120, 130, 140 to be displayed in line with the items 110, 120, 130, 140. Referring to FIG. 1C, the item 130 is shown upon a selection of the interactive feature 136 associated therewith as the interactive feature 136 is displayed on the mobile device 102, as is shown in FIG. 1B. The selection of the interactive feature 136 causes additional information regarding the item 130 to be displayed in an expanded state. For example, as is shown in FIG. 1C, additional details 135 regarding the item 130, e.g., details regarding the size or ingredients of the item 130, are shown, along with three items 132A, 132B, 132C that are related to the item 130, and selectable interactive features 136A, 136B, 136C associated with the related items 132A, 132B, 132C, respectively. The related items 132A, 132B, 132C may be identified with text, as is shown in FIG. 1C, or by one or more images (not shown), or in any other manner. The additional details 135 and the related items 132A, 132B, 132C associated with the item 130 are presented within a stream of the items 110, 120, 130, 140, which may be translated upward or downward in order to review information or data regarding one or more of the other items 110, 120, 140, 150.

Figure 1D:
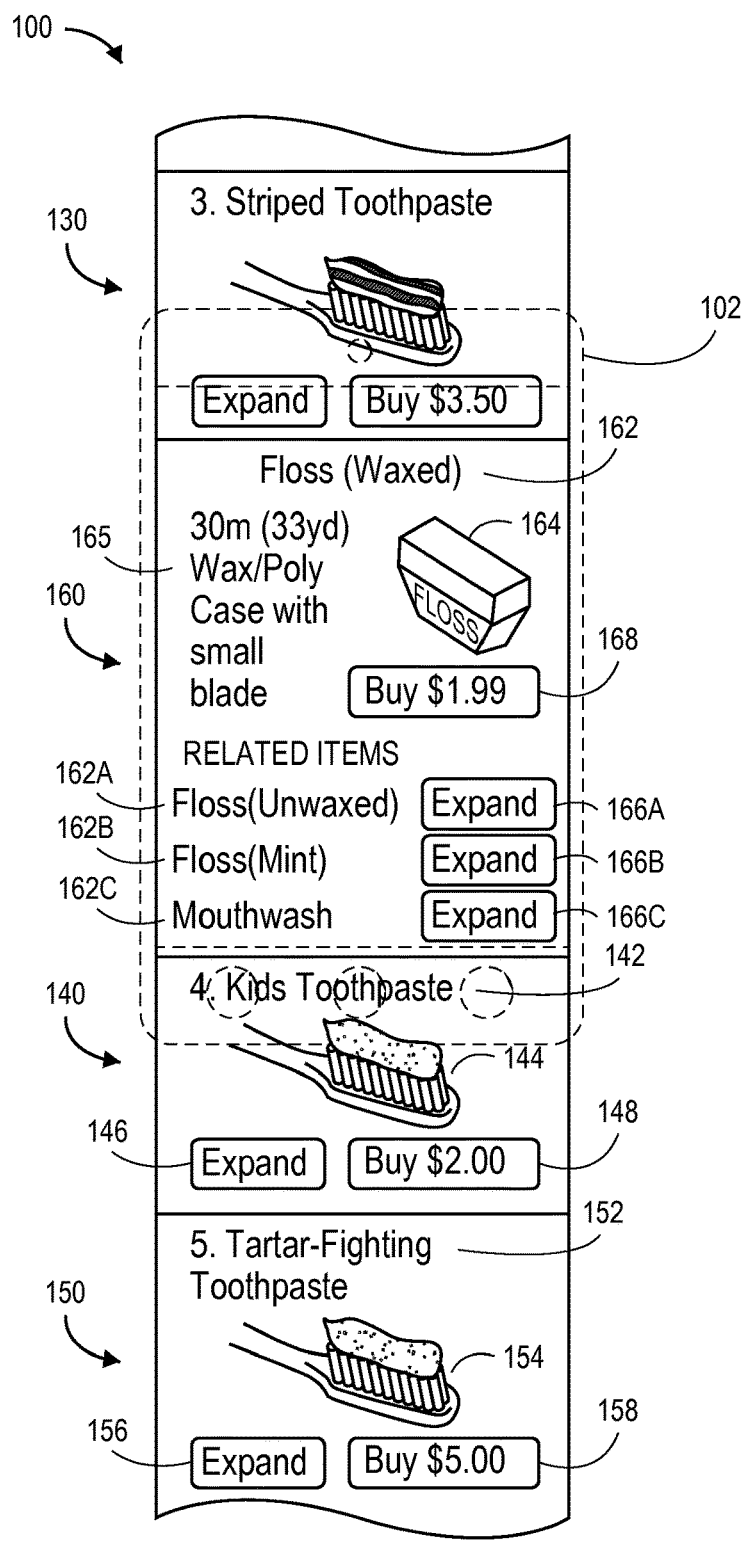

As is also discussed above, a selection of an interactive feature or linked element within the additional information displayed following a selection of an interactive feature associated with a search result may cause further information to be displayed within the stream. Referring to FIG. 1D, an item 160 is shown following a selection of the interactive feature 136B associated with the one of the related items 132B associated with the item 130, as is shown in FIG. 1C. The selection of the interactive feature 136B causes the information displayed regarding the item 130 to contract, and further causes the item 160 to be displayed immediately following the item 130 within the stream. Alternatively, the information displayed regarding the item 130 may remain visible and in an expanded state even while the item 160 is displayed below the item 130. As is shown in FIG. 1D, the item 160 includes a name 162 associated with the item 160, an image 164 of the item 160 and details 165 regarding the item 160, e.g., details regarding the size or ingredients of the item 160, a selectable interactive feature 168 for executing a purchase of the item 162, names 162A, 162B, 162C of three items that are related to the item 160, and selectable interactive features 166A, 166B, 166C associated with the items 162A, 162B, 162C, respectively. The details 165 and the related items 162A, 162B, 162C associated with the item 160 are presented within a stream of the items 130, 140, 150, viz., after the item 130 with which the related item 132B was associated, and the stream may be translated upward or downward in order to review information or data regarding one or more of the other items 110, 120, 130, 140, 150.

Figure 1E:
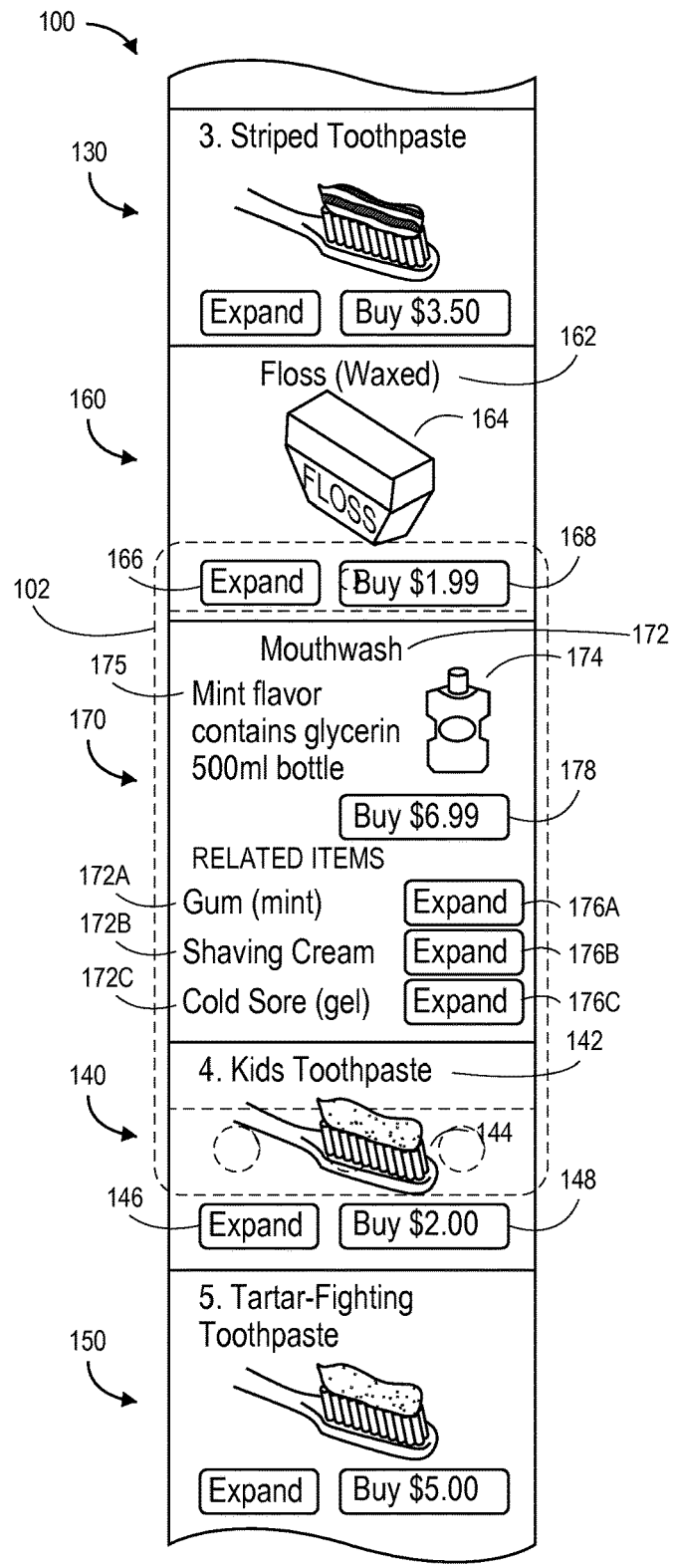

In accordance with the present disclosure, selecting still other interactive features or linked elements either within the information displayed following the selection of such features or elements relating to a search result, or features or elements within another search result, may cause even more information to be displayed within the stream of the search results. Referring to FIG. 1E, an item 170 is shown following a selection of the interactive feature 166B associated with the one of the related items 162B, as shown in FIG. 1D. The item 170 includes a name 172 and an image 174 of the item 170, details 175 regarding the item 170, e.g., details regarding the size or ingredients of the item 170, a selectable interactive feature 178 for executing a purchase of the item 170, names 172A, 172B, 172C of three items that are related to the item 170, and selectable interactive features 176A, 176B, 176C associated with the items 172A, 172B, 172C, respectively. The details 175 and the related items 172A, 172B, 172C associated with the item 170 are presented within a stream of the items 110, 120, 130, 160, 140, 150, viz., after the item 160 with which the related item 162B was associated, and the stream may be translated upward or downward in order to review information or data regarding one or more of the other items 110, 120, 130, 160, 140, 150.

Accordingly, the systems and methods of the present disclosure may be utilized to display a plurality of search results obtained in response to a search query provided by a user, and to insert information or data regarding one or more of the search results selected by the user within a stream of such search results. In this regard, providing the information associated with one or more of the selected search results within a stream of all of the search results creates a complete, linear history of a user's activity following his or her entry of the search query, thereby enabling the user to retrace his or her virtual steps and take one or more actions accordingly. For example, referring again to the system 100 of FIGS. 1A through 1E, a user of the smartphone 102 who wishes to purchase the item 130 (viz., the striped toothpaste), the item 160 (viz., the waxed floss) and the item 170 (viz., the mouthwash) may elect to wait before executing a purchase of either the item 130, the item 160 or the item 170 (viz., the mouthwash) until he or she has confirmed that each of the items 130, 160, 170 is available. Upon confirming that each of the items is available 130, 160, 170, the user may traverse his or her viewing history, as represented in the stream of the items 110, 120, 130, 160, 170, 140, 150, and select the interactive features 138, 168, 178 for executing purchases of the items 130, 160, 170 accordingly.

The systems and methods of the present disclosure may be further utilized to present information or data obtained following interactions with one or more search results obtained by a user from a search engine or other service in response to a search query within a stream of the search results, such that the stream embodies a virtual history of the user's activity in response to the search results. Where a user requests information or data by selecting a particular search result, that information or data is displayed in line with the search results, e.g., directly beneath the search result that was selected, and directly above a following search result. Subsequently, when the user requests further information or data by selecting the information or data that was displayed in line with the search results, or another of the search results, that further information or data may also be displayed, e.g., directly beneath the selected information or data, such that the user may return to the selected search result, or the selected information, by simply scrolling upward. Information or data regarding that which was previously displayed in line with the search results upon a selection of one of the search results may remain in line in an expanded form, or be contracted, when another of the search results is selected. In this regard, an original stream of search results displayed in response to a search query ultimately includes an entire history of the information or data obtained following an entry of the search query, even if some of the information or data bears no direct relation to the search query.

Moreover, according to some embodiments of the present disclosure, search results that follow a selected search result may be reordered or reconfigured based on the attributes of a selected search result, or on attributes of information or data relating to the selected search result. Because a selection of a specific search result displayed following an entry of an original search query at a search engine may provide greater guidance or clarity as to a level of interest in the search query or in one or more of the search results, or a reason why the search query was provided, the selection of the specific search result may selectively modify the order or manner in which search results following the specific search result are displayed. Similarly, a follow-on search may be conducted using the original search query along with any metadata that may be identified regarding a selection of one or more search results, as well as attributes of the selected search results themselves. In this regard, the systems and methods of the present disclosure may enhance the presentation of search results in response to a search query, by displaying search results that are more likely preferred by the user above or in an otherwise preferential manner with respect to other search results that are less likely preferred by the user.

A search engine is a computer-based module for retrieving information or data distributed across a network, e.g., in one or more physical or virtual data stores. A user may provide a search query comprised of one or more keywords to a search engine by a browser or other application. A browser is designed to receive requests for Internet or network-based resources from users on a local or client-side device, to transmit requests for coded information corresponding to the requested network-based resources to a remote or server-side application, to receive coded information corresponding to the requested resources from the remote or server-side applications, and to render the requested resources on a display screen on the local or client-side device. Other applications operating on local or client-side devices may perform similar functions for searching indexed information in a similar manner. Thus, when a user provides a search query to a browser or like application operating on a computer device, e.g., by typing the one or more keywords of the search query into a text box, the browser or like application may receive search results pertaining to the search query, and render one or more of the search results on a display of the computer device. Typically, information or data pertaining to search results is listed in a ranked order of relevance or priority based on a relationship between each of the search results and the search query itself, on attributes of a user, or on attributes of a context in which the search query is provided, e.g., a time or date on which the search query was entered, a location from which the search query was entered, a prior search history of the user, or on any other relevant factor.

A search query may comprise one or more keywords, or individual words or groupings of alphanumeric characters, as well as strings of multiple words or groupings of alphanumeric characters that may be separated by spaces, commas, dashes, colons, semicolons, or any other delimiter. Such keywords may be used to initiate searches, such as by entering a keyword into a search engine on a browser, or by selecting a keyword from a list, such as an online catalog. For example, the entry or selection of the keyword "holiday" may return a different set of results than the entry or selection of the keyword "holiday movies" or "holiday gift ideas." Additionally, a keyword can refer to a particular category (such as "hockey stick" or "news"), brand (such as "Holiday Inn"), or theme (such as "Halloween"), either specifically or generally, and may also refer to one or more particular items (such as "Nike Air Jordan shoes").

Search engines may be provided for general purposes, e.g., to return information or data pertaining to a search query from a broad network or system, or for one or more specific or targeted purposes. Commonly, an online marketplace may provide customers with a number of features that may be used to search or browse for items of interest, including one or more search engines which permit customers to perform keyword-based searches of an online catalog of items, or an array of selectable links or features, which permit customers to browse for items in one or more categories or groups. An entry of a search query into a search engine provided by an online marketplace, or a selection of a keyword-based category associated with the online marketplace, causes a display of an ordered list of items identified based on the entered search query or in the selected category.

The ordered list may include one or more interactive features or linked elements that may be selected in order to obtain additional information or data regarding one or more of the items, in the form of an item details page or a product details page. Such item details pages may include one or more features for reviewing information regarding an item, for adding the item to a virtual "shopping cart," for placing the item on a registry or "wish list," for purchasing the item outright, or taking any other action with regard to the item. The item detail page may include text, images or multimedia regarding the item, rankings or reviews of the item (which may be qualitative or quantitative in nature, and may be provided anonymously or with names of respective reviewers), as well as links to "chat rooms" or discussion forums, and may be linked or associated with one or more social networks or external sites or platforms. The item detail page may also provide one or more selectable or adjustable features (e.g., radio buttons, drop-down menus or text boxes) that permit a customer to specify any attributes of a desired item (e.g., sizes, colors, models or accessories).

In particular, item detail pages may also include advertisements for other recommended items that may complement or act as substitutes for an item. Such recommended items may be identified based on a searching, browsing or purchasing history of a user who provided a search query to the online marketplace, or on any known interests or attributes of the user. Alternatively, such recommended items may be identified based on searching, browsing or purchasing histories of other users who may have interests or attributes that are similar to those of the user who provided the search query, or on any other relevant factors.

When a user selects an interactive feature or linked element associated with one of a plurality of search results, a page including information or data regarding the search result may be displayed in the same window in which the search results are displayed, e.g., as a replacement for a page including the search results, or in a different window, e.g., presented above or alongside the page including the search results. For example, where code associated with a linked element includes a "target" attribute, the target attribute may define the default window in which a page is to be displayed following a selection of the linked element, such as in the same window in which the linked element was provided, in another existing window (e.g., where the value of the target attribute identifies the existing window specifically or by default), or in a new window (e.g., where the value of the target attribute was "blank").

Therefore, when visiting an online marketplace, a customer may execute any number of interactions with one or more web pages associated with the online marketplace, including web pages that are intrinsic to the online marketplace or web pages that may be hosted externally, such by searching for items through the entry of any number of keywords into a search engine, or browsing for items that have been designated and sorted into any number of categories. A customer may further select and view any number of item detail pages, read or provide any number of customer reviews or ratings of items, view any number of images of items (e.g., zoom or pan such images, or select alternate images or views of the item). Additionally, a customer may traverse through any amount or extent of one or more item detail pages or results lists, including information displayed in a top, bottom, or intermediate portion of such pages.

The systems and methods of the present disclosure are directed to placing information or data requested following the display of search results within a stream or list of such search results, such that a visual history of the user's activity may be presented within the stream or list and on a common window or display. A user may select one of the search results in the stream or list, and cause the search result to expand or otherwise display additional information within the stream or list, e.g., immediately following or adjacent to the selected search result. Such features are particularly valuable for mobile devices, which have screens or displays of nominal sizes, e.g., approximately four to six inches (4"-6") diagonally across. When further search results or aspects of the additional information are subsequently selected, new items or additional information may be added to the list, and the previously selected search results or additional information may remain visible in an expanded state or be contracted within the stream or list. Moreover, because the selection of search results or additional information may imply a preference for a particular search result or a type of the search results obtained based on a search query, the items in the list that follow a selected search result may be reordered based on the aspects of the selected item or the selection thereof, or on any other relevant factor, or a follow-on search using the search query and any metadata regarding selections of results or information, or attributes of the selected results or information, may be performed.

Figure 2:
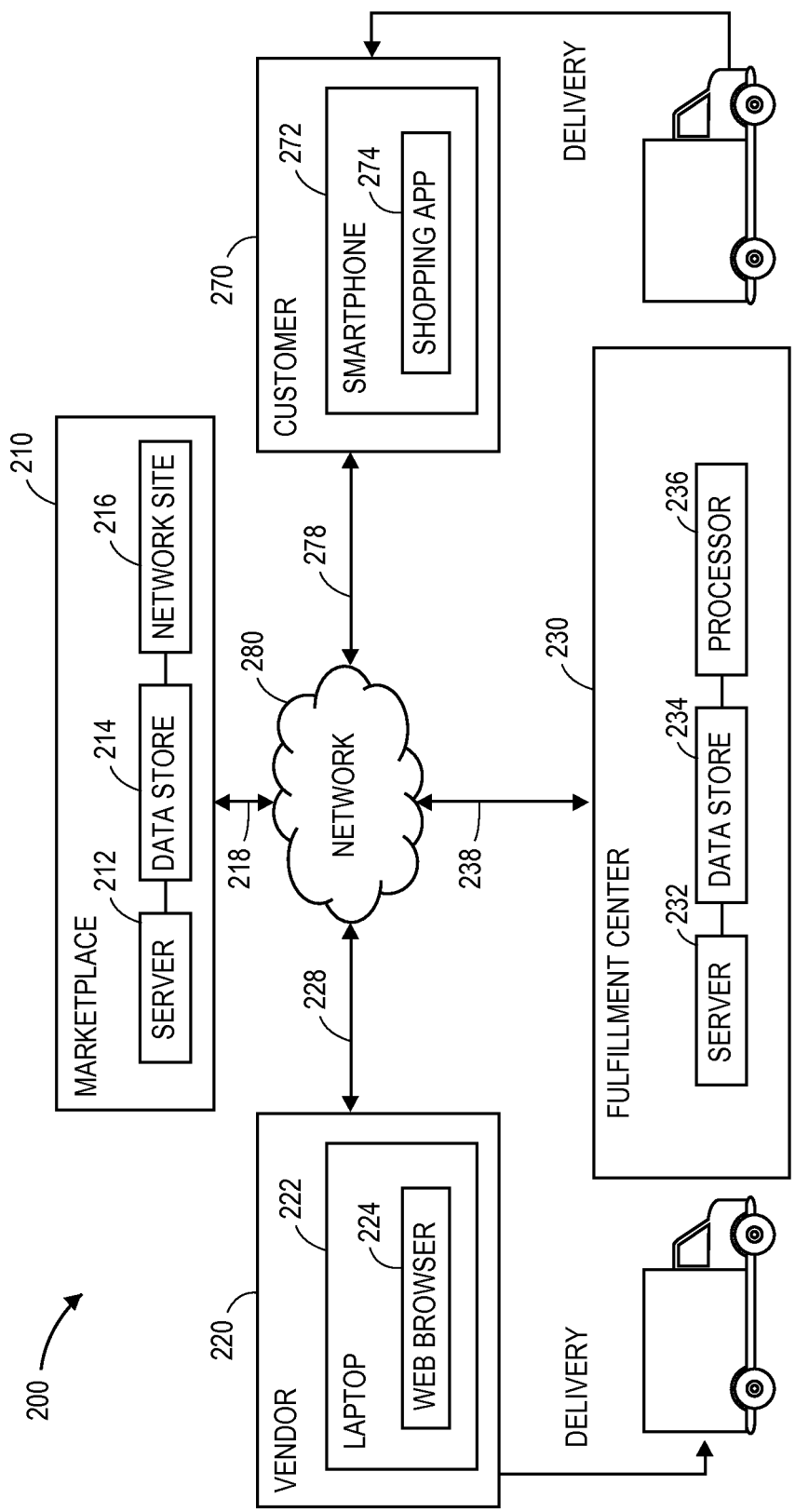
FIG. 2 is a block diagram of components of one system for displaying in-stream pivoting search results in accordance with embodiments of the present disclosure.

Referring to FIG. 2, a block diagram of components of one system 200 for displaying in-stream pivoting search results in accordance with embodiments of the present disclosure is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 280, as indicated by line 218, through the sending and receiving of digital data. Moreover, the data store 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 224, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items on behalf of the marketplace 210. As is shown in FIG. 2, the fulfillment center 230 includes a networked computer infrastructure for performing various computer-related functions associated with the receipt, storage, processing and distribution of such items, including one or more physical computer servers 232, data stores (e.g., databases) 234 and processors 236, that may be provided in the same physical location as the fulfillment center 210, or in one or more alternate or virtual locations, e.g., in a "cloud"-based environment. The fulfillment center 230 may also include stations for receiving, storing and distributing items to customers, such as one or more receiving stations, storage areas and distribution stations. The fulfillment center 230 may also include any number of workers or other designated personnel tasked with performing one or more tasks within the fulfillment center 230, e.g., by handling or transporting items within the fulfillment center 230, or operating one or more pieces of equipment therein.

The fulfillment center 230 may operate one or more order processing and/or communication systems using computer devices in communication with one or more of the server 232, the data store 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with one or more workers, or the various storage facilities and other components of the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," or a "customer" may be typically performed by a human operator, but could, alternatively, be performed by an automated agent.

The marketplace 210, the vendor 220, the fulfillment center 230 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the display of in-stream pivoting search results in response to search queries provided to an online marketplace, e.g., a search for items relating to a keyword, or a selection of a category of items, and the display of ordered lists of information or data regarding items relating to the keyword or in the category, those of ordinary skill in the pertinent arts will recognize that the systems and methods disclosed herein are not so limited. Rather, the in-stream pivoting search results identified or displayed in accordance with the present disclosure may be utilized in connection with any entry of any search query to any search engine, and the identification or display of search results pertaining to any search query, or any selection of any category, and the identification or display of information or data in any category, in accordance with the present disclosure.

Figure 3:
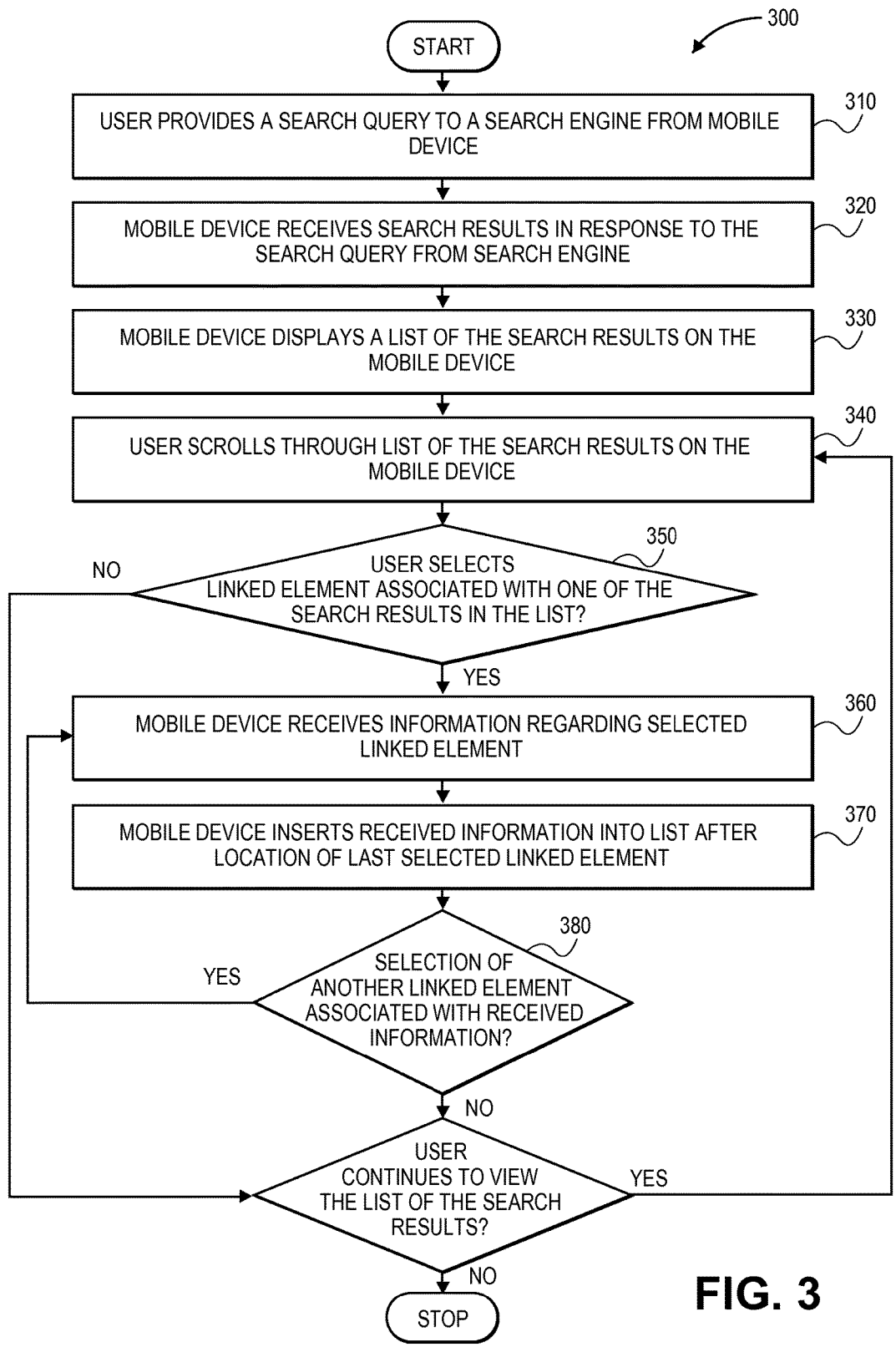
FIG. 3 is a flow chart of one process for displaying in-stream pivoting search results in accordance with embodiments of the present disclosure.

As is discussed above, some embodiments of the present disclosure are directed to receiving search queries from users, obtaining and displaying search results based on such queries in streams, receiving interactions with one or more of the search results from users, and displaying information associated with the search results with which the users interacted within such streams. Referring to FIG. 3, a flow chart 300 representing one process for displaying in-stream pivoting search results in accordance with embodiments of the present disclosure is shown.

At box 310, a user provides a search query to a search engine from a mobile device. The search query may comprise one or more keywords entered into a text box provided in an application operating on the mobile device, e.g., a browser, or, alternatively, a selection of a keyword corresponding to a category. According to some embodiments, the search engine may be associated with an online marketplace, and the search query may be provided or selected in order to search or browse for one or more items. At box 320, the mobile device receives search results in response to the search query from the search engine. Such results may be based directly on the search query alone or in combination with one or more other relevant factors, e.g., a time or date on which the search query was provided, a location from which the search query was provided, or any search queries previously provided by the user.

At box 330, the mobile device displays a list of the search results on the mobile device. The list may include text, images or identifiers of the respective search results, as well as one or more interactive features or linked elements relating to the respective search results, or any other information associated with the respective search results. At box 340, the user scrolls through the list of the search results on the mobile device, e.g., by stroking a finger across a touchscreen or in any other manner that may be known to those of ordinary skill in the pertinent arts.

At box 350, whether the user has selected a linked element associated with one of the search results in the list is determined. The linked element may be, for example, a set of text, button, icon, image or other feature linked to one or more networked resources, e.g., to one or more sets of information or data relating to the search result, or relating to one or more external pages. If the user selects a linked element associated with one of the search results, then the process advances to box 360, where the mobile device receives information regarding the selected linked element. Any content relating to a linked element, e.g., all or a portion of a networked resource associated with the search result and to which the linked element is linked, may be received upon a selection of the linked element.

At box 370, the mobile device inserts the received information into the list of search results following the location of the selected linked element. The information may appear immediately below the search result as a whole, or below or within the selected linked element itself. For example, if the search engine is associated with an online marketplace, and a list of items is returned to the search engine upon the entry of a keyword, the selection of a hyperlink associated with one of the items may cause expanded information regarding the one of the items, e.g., the details 165, the selectable interactive feature 168 or the names or other information regarding other items 162A, 162B, 162C that are related to the item 160, as shown in FIG. 1D, to appear below the hyperlink and above the next item within the list.

At box 380, whether a selection of another linked element is received may be determined. For example, a hyperlink associated with another search result, or with information provided in response to an interaction with a search result, may be selected. If another linked element has been selected, then the process returns to box 360, where information regarding the selected linked element is received, and to box 370, where the mobile device inserts that information into the list of search results following the selected linked element. If no other linked elements are selected at box 380, however, or if the user fails to select a linked element at box 350, then the process advances to box 390, where it is determined whether the user continues to view the list of search results. If the user continues to view the list of search results, then the process returns to box 340, where the user scrolls through the list. If the user does not continue to view the list of search results, however, then the process ends.

Figure 4A:
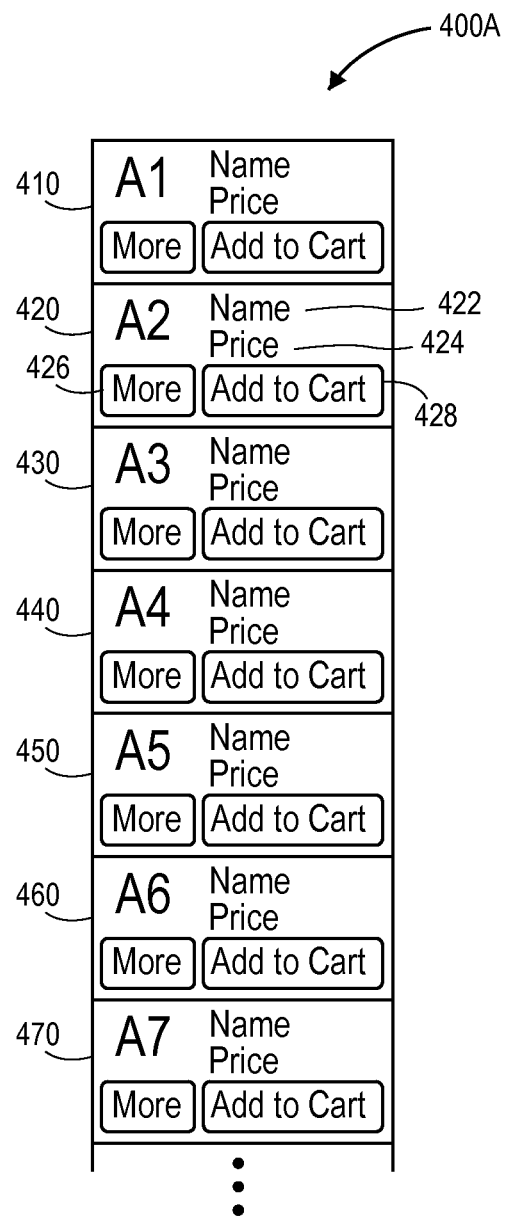
FIGS. 4A through 4D are views of in-stream pivoting search results in accordance with embodiments of the present disclosure.

The capacity of the systems and methods disclosed herein to identify supplemental information regarding one or more entries in a list, e.g., a list of search results obtained in response to a search query, and display the supplemental information in line with the entries may be shown with regard to FIGS. 4A, 4B, 4C and 4D. Referring to FIG. 4A, a list 400A of records 410, 420, 430, 440, 450, 460, 470 is shown. The records 410, 420, 430, 440, 450, 460, 470 correspond to a variety of items and include information or data regarding each of the items, e.g., names and prices of the items, as well as selectable features for executing one or more functions relating to the items. For example, as is shown in FIG. 4A, the record 420 includes a name 422 of the item, a price 424 of the item, a selectable feature 426 for viewing additional information regarding the item and a selectable feature 428 for executing a purchase of the item.

Figure 4B:
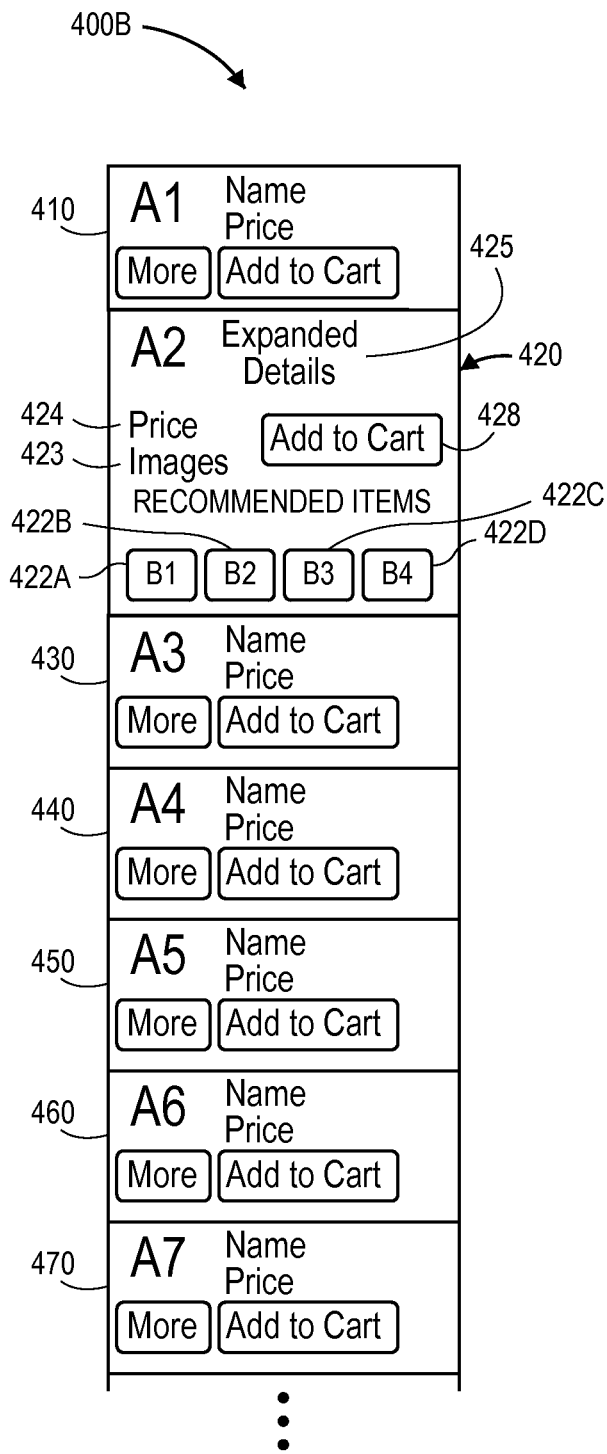

Referring to FIG. 4B, a list 400B of the records 410, 420, 430, 440, 450, 460, 470 is shown following a selection of the selectable feature 426 shown in FIG. 4A. The selection of the selectable feature 426 causes the record 420 to broaden to include images 423 of the item, expanded details 425 regarding the item and a plurality of selectable features 422A, 422B, 422C, 422D corresponding to item recommendations based on the item, such as substitutable items (e.g., items that may be purchased as replacements for the item) or complementary items (e.g., items that may be purchased as accessories or accompaniments for the item). The item recommendations may be identified by alphanumeric characters or with images, or in any other manner, in accordance with the present disclosure. As is shown in FIG. 4B, the images 423, the expanded details 425 and the selectable features 422A, 422B, 422C, 422D are displayed within the list 400B, e.g., above the next record 430, such that the records 410, 420, 430, 440, 450, 460, 470 remain in their given order despite the insertion of the images 423, the details 425 and the selectable features 422A, 422B, 422C, 422D into the list 400B.

Figure 4C:
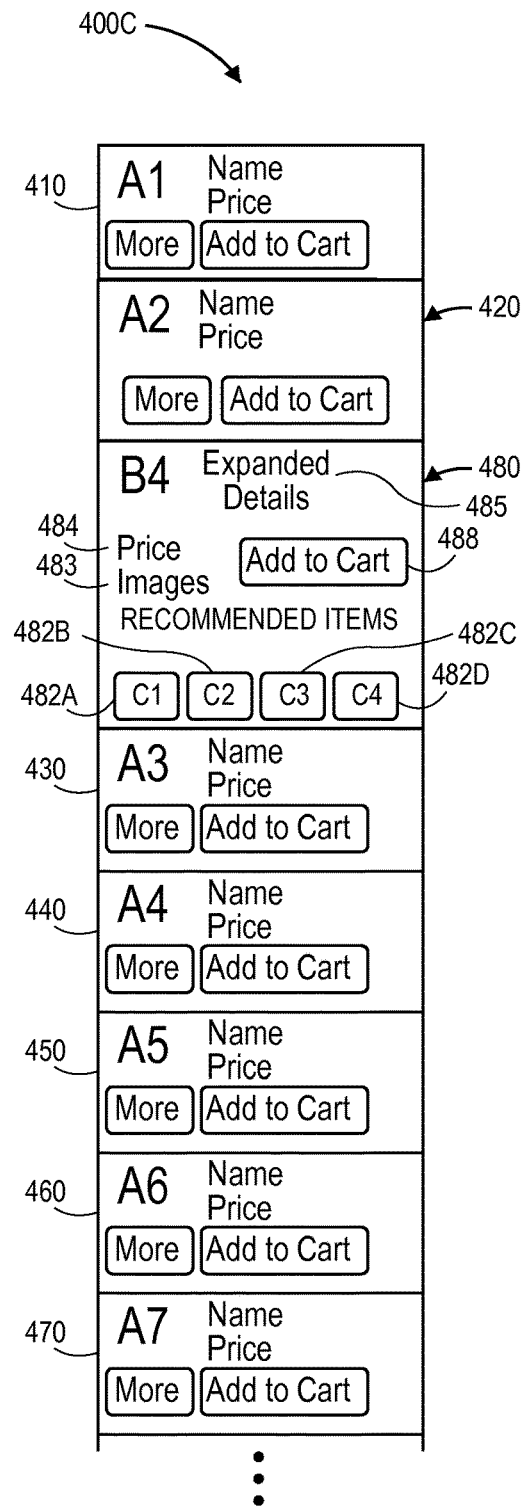

Referring to FIG. 4C, a list 400C of the records 410, 420, 430, 440, 450, 460, 470 and a new record 480 is shown following a selection of the selectable feature 422D of FIG. 4B, which causes the record 420 to contract and also causes the new record 480 to appear within the list 400C. The new record 480 corresponds to the item associated with the selectable feature 422D of FIG. 4B, and includes images 483 of the item, a price 484 of the item, expanded details 485 regarding the item, a selectable feature 488 for executing a purchase of the item and a plurality of selectable features 482A, 482B, 482C, 482D corresponding to item recommendations based on that item. As is shown in FIG. 4C, the new record 480 is inserted within the list 400C, e.g., between the record 420 and the record 430, effectively breaking the rank or ordering of the records 410, 420, 430, 440, 450, 460, 470. As a result, the list 400C represents a visual history of the user's activity, e.g., the original list 400A of the records 410, 420, 430, 440, 450, 460, 470 requested by the user, as shown in FIG. 4A, amended to include the new record 480 requested by the user, at or near a location from which the new record 480 was requested. Alternatively, those of ordinary skill in the pertinent art will recognize that the record 420 may remain in an expanded state even after the selection of the selectable feature 422D.

Figure 4D:
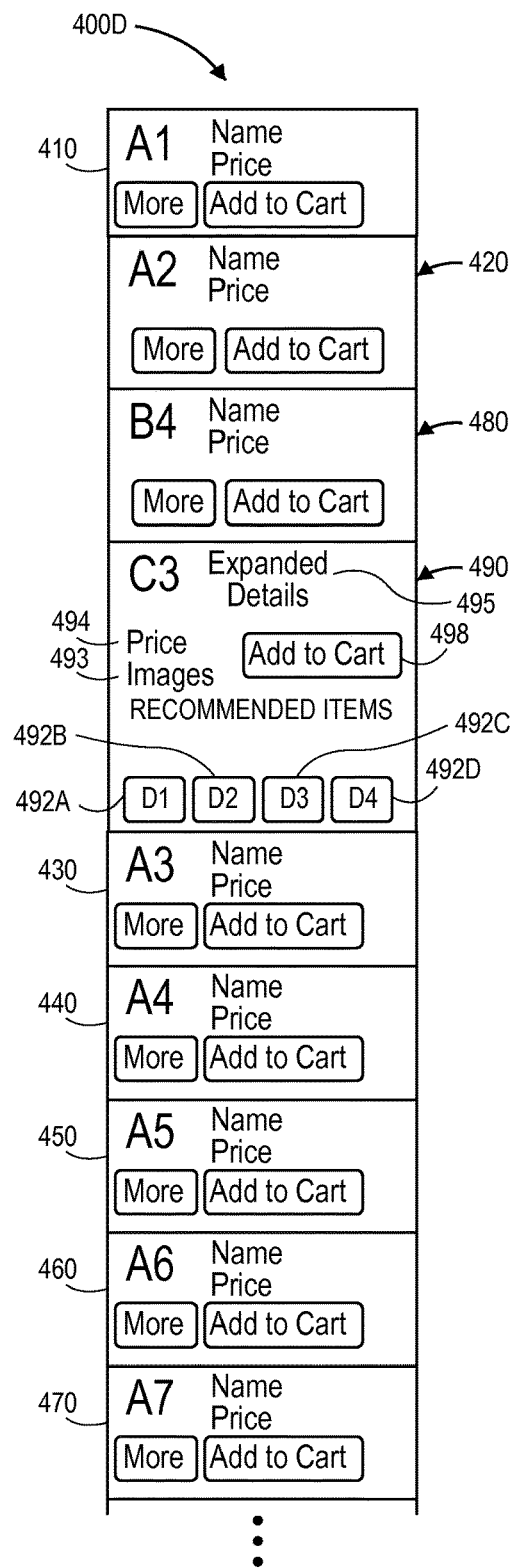

Referring to FIG. 4D, a list 400D of the records 410, 420, 430, 440, 450, 460, 470, 480 and a new record 490 is shown following a selection of the selectable feature 482C of FIG. 4C, which causes the record 480 to contract and also causes the new record 490 to appear within the list 400D. The new record 490 corresponds to the item associated with the selectable feature 482C of FIG. 4C, and includes images 493 of the item, a price 494 of the item, expanded details 495 regarding the item, a selectable feature 498 for executing a purchase of the item and a plurality of selectable features 492A, 492B, 492C, 492D corresponding to item recommendations based on that item. As is shown in FIG. 4D, the new record 490 is inserted within the list 400D, e.g., between the record 480 and the record 430. As a result, the list 400D further represents a visual history of the user's activity, e.g., the original list 400A of the records 410, 420, 430, 440, 450, 460, 470 requested by the user, as shown in FIG. 4A, amended to include the new records 480, 490 requested by the user, at or near locations from which the new records 480, 490 were requested. Alternatively, those of ordinary skill in the pertinent art will recognize that the record 480 may remain in an expanded state even after the selection of the selectable feature 482C.

Accordingly, the systems and methods of the present disclosure may display requested content relating to one or more entries in a list within the list itself, thereby creating a representation of a user's browsing history that the user may review by scrolling upward or downward. For example, the entries may pivot or expand to include additional information, e.g., the expansion of the record 420 from FIG. 4A to FIG. 4B, or new entries may be added, e.g., the new records 480, 490 of FIGS. 4C and 4D. As such, the systems and methods may enable the user to obtain more appropriate information after submitting a search query, or to interact with one or more of the sets of information from within a common user interface and without having to depart from content shown in a first window in order to view or interact with content shown in a second window or further additional windows.

Additionally, the systems and methods disclosed herein may, upon an interaction with one or more search results in a list by a user of a mobile device, be configured to reorder the following search results based at least in part on the type or extent of the interaction with the search results, or one or more attributes of the search results with which the user interacted, or to conduct one or more follow-on searches based on an initial search query and metadata regarding any of the search results with which the user interacted, or on attributes of one or more of such results. Because many search results identified based on a search query and displayed in a list are not immediately visible on the mobile device's screen, search results which fall outside of the mobile device's screen may be reordered without the user's knowledge and may appear, in a reordered state, when the user translates the screen upward to expose additional results. Alternatively, a follow-on search may be conducted based on the search query and one or more sets of metadata or attributes, and the results of the follow-on search may be added to the list as substitutes for results identified based on the search query alone which fall outside of the mobile device's screen.

Figure 5:
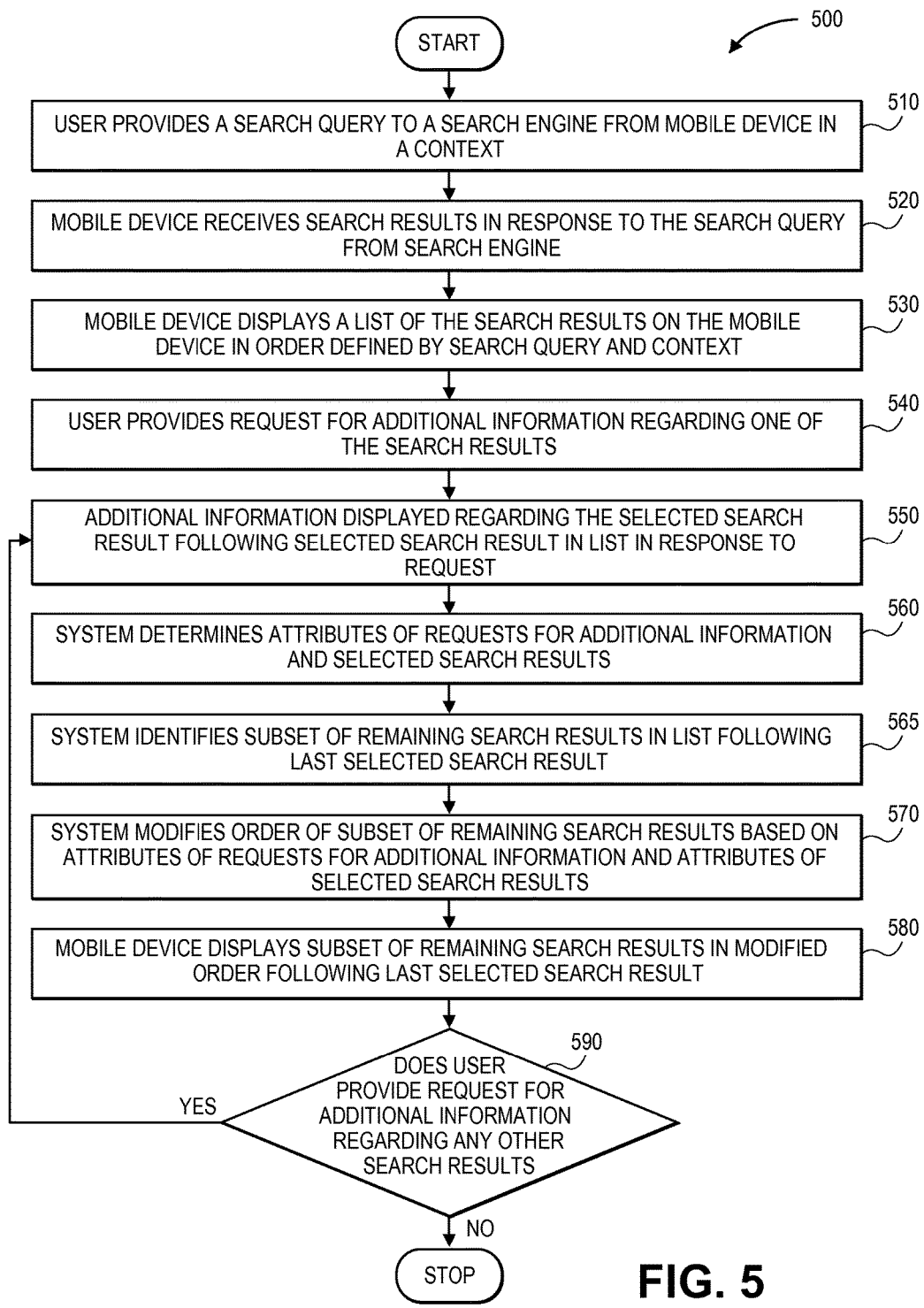
FIG. 5 is a flow chart of one process for displaying in-stream pivoting search results in accordance with embodiments of the present disclosure.

Referring to FIG. 5, a flow chart 500 representing one process for displaying in-stream pivoting search results in accordance with embodiments of the present disclosure is shown. At box 510, a user provides a search query to a search engine from a mobile device in a particular context. For example, the user may enter one or more keywords into a text box or other like feature, or select one or more categories, while using the mobile device in any manner, e.g., for shopping, conducting research, accessing a social network or performing any other function.

At box 520, the mobile device receives search results in response to the search query, and at box 530, the mobile device displays a list of the search results on the mobile device in an order defined by the search query and the context. For example, where the user is searching for an item at an online marketplace, the user may enter a keyword or select a category of items, and a list of items pertaining to that keyword or in that category may be returned, with the items ordered or ranked based on the extent of their relation to the keyword or their prominence within the category, along with any relevant attributes of the user, e.g., a purchasing history, location or age of the user.

At box 540, the user provides a request for additional information regarding one of the search results. For example, referring again to the items 110, 120, 130, 140 of FIG. 1A, the user may select one or more of the selectable interactive features 116, 126, 136, 146, 118, 128, 138, 148 to obtain additional information regarding one or more of the items 110, 120, 130, 140 or execute a purchase of one or more of the items 110, 120, 130, 140. At box 550, the additional information regarding the selected search result is displayed following the selected search result in the list in response to the request. For example, referring again to FIGS. 1A through 1E, selecting one or more of the selectable interactive features 116, 126, 136, 146 causes the item 110, 120, 130, 140 to expand within the list, while selecting one or more of the selectable interactive features 166A, 166B, 166C, 176A, 176B, 176C causes a new item to appear within the list.

After the additional information regarding the selected search result is displayed in response to the request, the process advances to box 560, where the system determines attributes of the requests for additional information and the selected search results. For example, the system may identify one or more features, characteristics or details regarding the selection of the search result, or of the search result itself. At box 565, the system identifies a subset of the remaining search results in the list following the last selected search result. For example, where a list of ten search results is returned in response to a search query, and the user selects the sixth search result, the remaining four search results in the list may be identified.

At box 570, the system modifies the order of the subset of the remaining search results based on the attributes of the requests for additional information and the attributes of the selected search results. For example, where the user enters a search query of "button down shirts," receives a list of such shirts in response, and selects a red shirt in the list in order to obtain additional information or details regarding the red shirt, the system may reorder all of the shirts shown after the selected red shirt in the list to preferentially rank shirts that are colored red higher than other shirts that are not colored red. At box 580, the mobile device displays the subset of the remaining search results in the modified order following the last selected search result.

At box 590, whether the user requests additional information regarding any other search results, e.g., by selecting one or more of the search results already displayed, is determined. If the user requests any additional information regarding any of the search results, then the process returns to box 550, and the requested additional information is displayed following the search result that was selected. If the user does not request any additional information regarding any other search results, however, then the process ends.

Figures 6A, 6B:
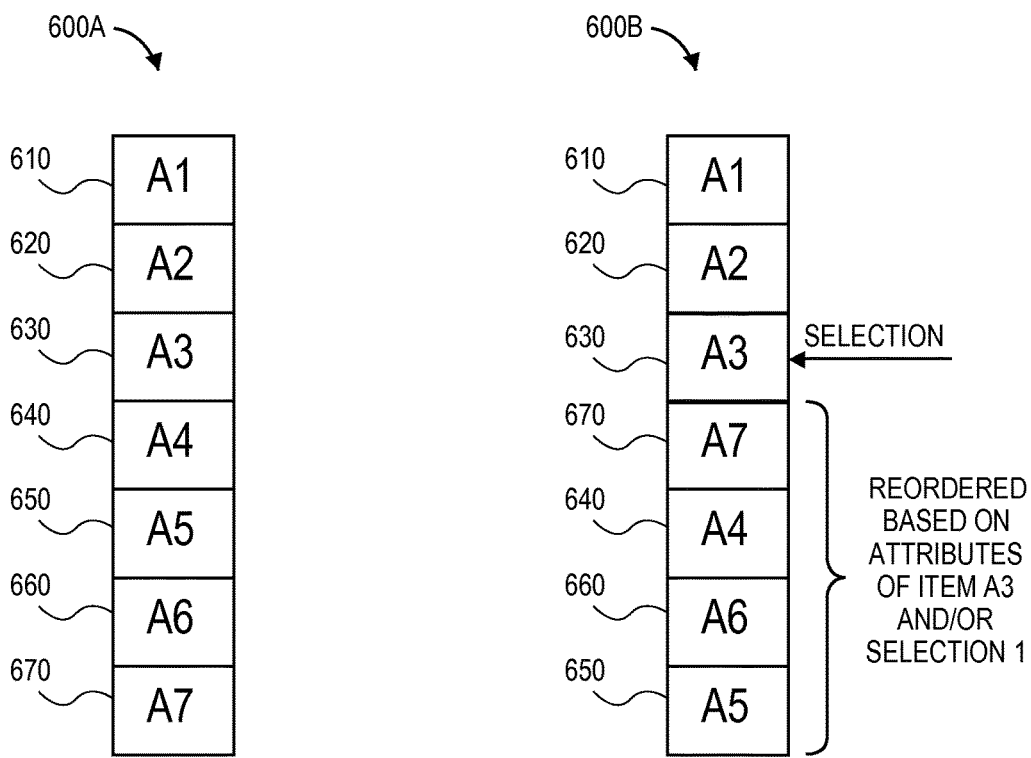
FIGS. 6A and 6B are views of in-stream pivoting search results in accordance with embodiments of the present disclosure.

One example of the reordering of search results within a list is shown with regard to FIGS. 6A and 6B. Referring to FIG. 6A, an ordered list 600A of items 610, 620, 630, 640, 650, 660, 670 is shown. Referring to FIG. 6B, an ordered list 600B of the items 610, 620, 630, 640, 650, 660, 670 is shown following the selection of one of the items 630. The items 640, 650, 660, 670 following the selected item 630 are reordered based on attributes of the item 630, or on attributes of the selection of the item 630, e.g., whether the selection is intended to view expanded details regarding the item 630 or to purchase the item 630. Where the selection of the item 630 is intended to obtain additional information regarding the item 630, then items that may be purchased as replacements or substitutes for the item 630 may be preferentially elevated within the list. Conversely, where the selection of the item 630 is intended to execute a purchase of the item 630, then complements or accessories to the item 630 may be preferentially elevated within the list. Likewise, where the item 630 has one or more specific attributes, e.g., sizes, shapes, colors, intended uses or the like, items having one or more of the specific attributes may be preferentially elevated within the list.

Figure 7A:
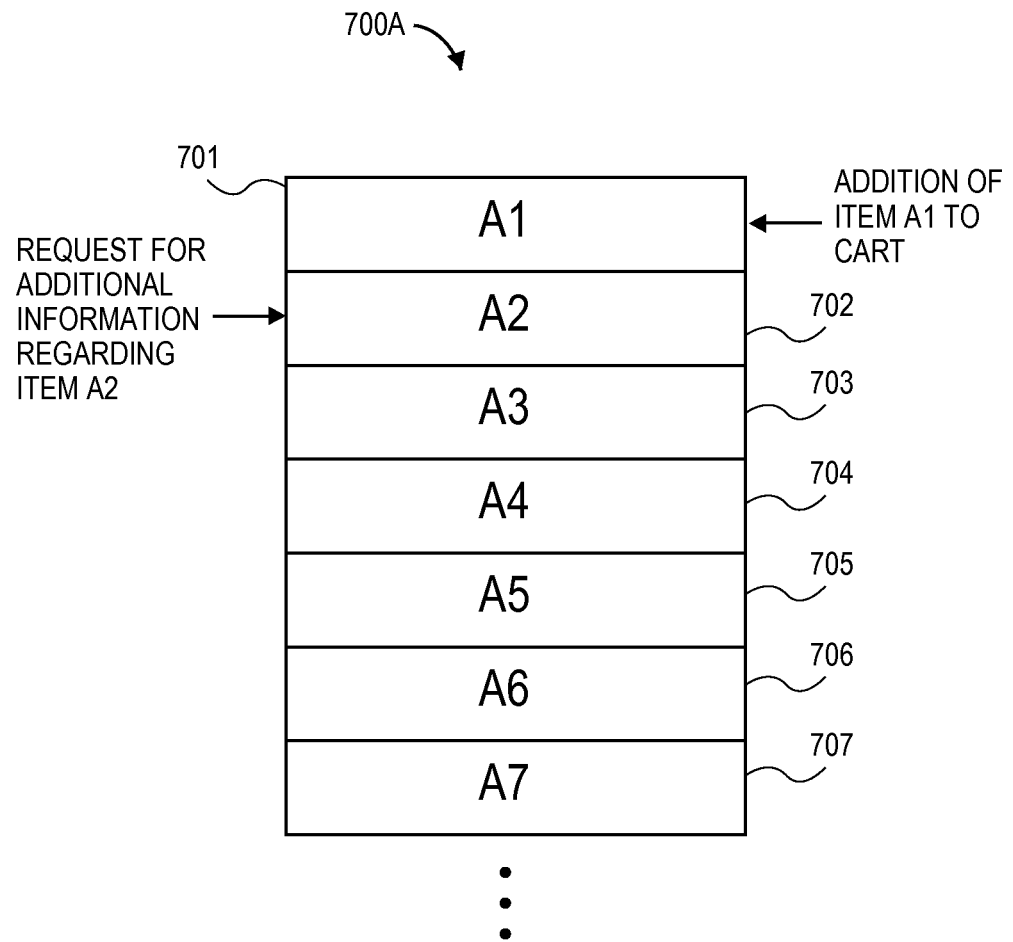
FIGS. 7A, 7B and 7C are views of in-stream pivoting search results in accordance with embodiments of the present disclosure.
Figure 7B:
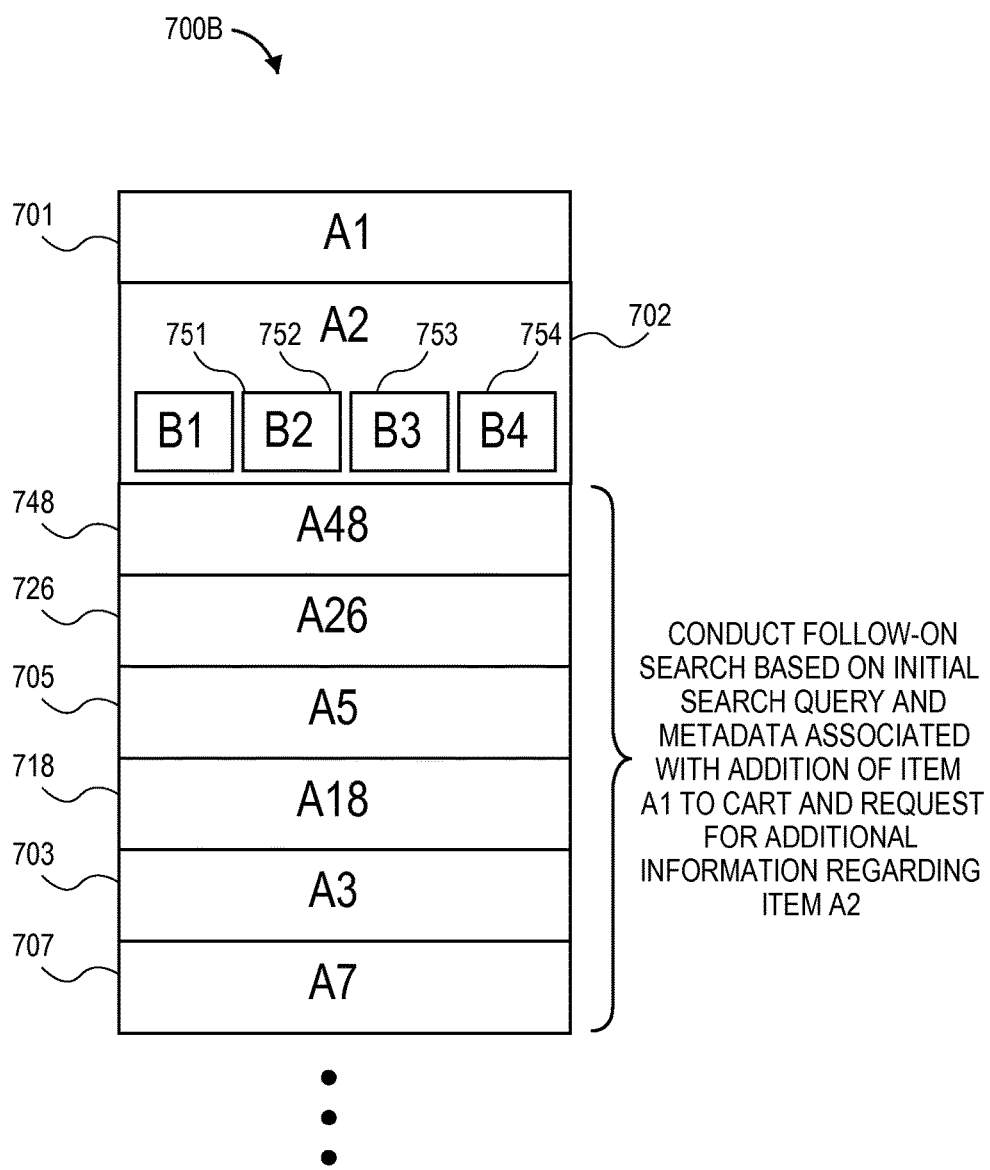

Additionally, after one of a plurality of search results obtained based on an initial search query and displayed within a list is selected, a follow-on search may be conducted based on the initial search query and metadata associated with the selection of the search result, and any other relevant information or data. Referring to FIG. 7A, an ordered list 700A of search results including items 701, 702, 703, 704, 705, 706, 707 is shown. As is shown in FIG. 7A, within the list 700A, the item 701 is added to a virtual shopping cart, and additional information is selected regarding item 702. Referring to FIG. 7B, an ordered list 700B of search results including item 701, 702, 748, 726, 705, 718, 703, 707 is shown. The selection of the item 702 causes a plurality of recommended items 751, 752, 753, 754 to be displayed in association with the item 702. The addition of the item 701 to a virtual shopping cart and/or the selection of the item 702 further causes a follow-on search to be conducted based on an initial search query that was provided in order to identify the items 701, 702, 703, 704, 705, 706, 707, along with any type or form of metadata associated with the addition of the item 701 to the virtual shopping cart and the request for additional information regarding the item 702. The results of the follow-on search are displayed immediately following the item 702 within the list.

Figure 7C:
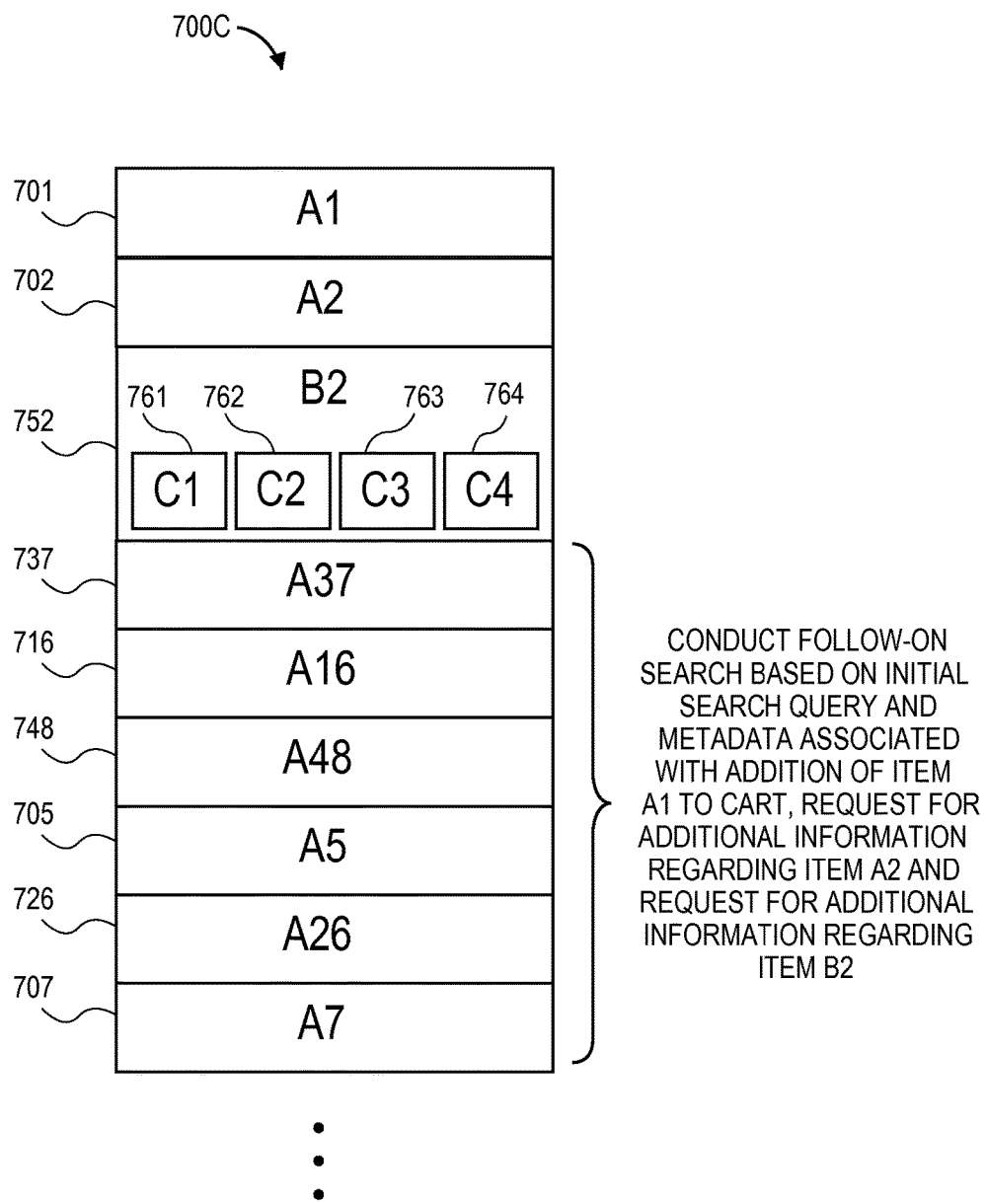

Further follow-on searches may be conducted based on the initial search query and information regarding further interactions with other search results, or requests for additional information regarding one or more of such results. Referring to FIG. 7C, an ordered list 700C of search results including items 701, 702, 752, 737, 716, 748, 705, 726, 707 is shown following a selection of one of the items 752 of FIG. 7B by which additional information regarding the item 752 is requested. The selection of the item 752 results in the addition of a new record corresponding to the item 752 to the list, and the display of recommended items 761, 762, 763, 764 in association with the item 752. Additionally, the selection of the item 752 also causes a follow-on search to be conducted based on the initial search query and any metadata associated with the addition of the item 701 to the virtual shopping cart, the request for additional information regarding the item 702, or the request for additional information regarding the item 752.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as including in-stream pivoting search results in response to search queries at an online marketplace, the systems and methods disclosed herein are not so limited, and the in-stream pivoting search results disclosed herein may be provided in response to any type or form of search query provided to any type or form of search engine, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 5, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale, and do not limit, in any way, the number, type or style of in-stream pivoting search results that may be provided in accordance with the present disclosure, or the computer devices, systems or networks by which such results may be provided.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A mobile computing system comprising:
a display screen;
one or more processors; and
one or more memory components having machine-executable instructions configured for execution by the one or more processors to cause the computing system to at least:
receive at least one keyword from a user;
identify a first plurality of items associated with the at least one keyword;
determine a first order of the first plurality of items based at least in part on a relationship of each of the first plurality of items with the at least one keyword;
cause a display of a list of a first plurality of records within a user interface on the display screen, wherein each of the first plurality of records comprises information regarding one of the first plurality of items, and wherein the list of the first plurality of records is displayed according to the first order;
receive a first interaction with at least a portion of a first record in the user interface, wherein the first record comprises first information regarding a first item, and wherein the first item is one of the plurality of items;
in response to receiving the first interaction,
identify supplemental information regarding the first item;
expand the first record within the user interface;
cause a display of at least some of the supplemental information regarding the first item within the expanded first record, wherein the supplemental information regarding the first item comprises second information regarding a second item associated with the first item, and wherein the second information comprises at least one of a name of the second item or a price of the second item;
identify a second plurality of items, wherein each of the second plurality of items is one of the first plurality of items, and wherein each of the second plurality of items follows the first item in the first order;
determine at least one attribute of the first item;
determine a second order of the second plurality of items based at least in part on a relationship of each of the second plurality of items with the at least one attribute of the first item;
cause a display of a second plurality of records following the expanded first record within the user interface on the display screen, wherein each of the second plurality of records comprises information regarding one of the second plurality of items, and wherein the list of the second plurality of records is displayed according to the second order;
receive a second interaction with at least some of the second information within the expanded first record;
identify third information regarding the second item; and
cause a display of a second record after the expanded first record and prior to the second plurality of records, wherein the second record comprises at least some of the second information and at least some of the third information.

2. The mobile computing device of claim 1, wherein the first interaction with at least the portion of the first record comprises a request to add the first item to a virtual shopping cart, and
wherein the second item is a complement to the first item.

3. The mobile computing device of claim 1, wherein the first interaction with at least the portion of the first record comprises a request to view supplemental information regarding the first item, and
wherein the second item is a substitute for the first item.

4. The mobile computing device of claim 1, wherein the machine-executable instructions are further configured for execution by the one or more processors to cause the computing system to at least:
receive a second interaction with at least a portion of a second record in the user interface, wherein the second record is one of the second plurality of records, and wherein the second record comprises third information regarding a third item;
identify supplemental information regarding the third item;
expand the second record within the user interface; and
cause a display of at least some of the supplemental information regarding the third item within the expanded second record, wherein the supplemental information regarding the third item comprises fourth information regarding a fourth item associated with the third item, and wherein the fourth information comprises at least one of a name of the fourth item or a price of the fourth item.

5. A computer-implemented method comprising:

defining an ordered stream of a first plurality of records by at least one computer processor, wherein each of the first plurality of records corresponds to one of a first plurality of items identified in response to a search query, and wherein each of the first plurality of records comprises information corresponding to one of the first plurality of items;

causing a display of at least a portion of the ordered stream in a user interface on a display screen of a mobile computer device by the at least one computer processor, wherein the portion of the ordered stream comprises at least one of the first plurality of records;

receiving a selection of at least a portion of a first record via the user interface by the at least one computer processor, wherein the first record is one of the first plurality of records, and wherein the first record comprises first information regarding a first item of the first plurality of items; and in response to the selection of at least the portion of the first record, determining at least one attribute of the first item by the at least one computer processor;

identifying at least a second item based at least in part on the at least one attribute of the first item by the at least one computer processor;

expanding the first record in at least one direction within the ordered stream in the user interface by the at least one computer processor;

causing a display of second information associated with the second item within the expanded first record on the display screen by the at least one computer processor, wherein the second information comprises an identifier of the second item and a selectable feature corresponding to the second item;

receiving a selection of at least a portion of the expanded first record via the user interface by the at least one computer processor, wherein the portion of the expanded first record comprises at least some of the second information;

in response to the selection of at least the portion of the expanded record, identifying third information regarding the second item by the at least one computer processor; and causing a display of a second record after the expanded first record and prior to the second plurality of records by the at least one computer processor, wherein the second record comprises at least some of the second information and at least some of the third information.

6. The computer-implemented method of claim 5, wherein the display screen is a touchscreen display, and wherein the selection of the portion of the first record is received on the touchscreen display.

7. The computer-implemented method of claim 5, wherein defining the ordered stream of the first plurality of records comprises:

receiving a selection of at least one category by a user via the display screen by the at least one computer processor, wherein the search query comprises the at least one category; and identifying the first plurality of records based at least in part on the at least one category by the at least one computer processor.

8. The computer-implemented method of claim 5, wherein defining the ordered stream of the first plurality of records comprises:

receiving an entry of at least one keyword from the user via the display screen by the at least one computer processor, wherein the search query comprises the at least one keyword; and identifying the first plurality of records based at least in part on the at least one keyword by the at least one computer processor.

9. The computer-implemented method of claim 5, wherein the first information comprises an identifier of the first item and a price of the first item, and wherein the computer-implemented method further comprises:

in response to the selection of at least the portion of the first record, identifying a second plurality of items based at least in part on the at least one attribute of the first item by the at least one computer processor; and ranking the second plurality of items based at least in part on a relationship of each of the second plurality of items with the at least one attribute of the first item by the at least one computer processor, wherein the second item is a highest ranking one of the second plurality of items.

10. The computer-implemented method of claim 9, wherein receiving the selection of at least the portion of the expanded first record further comprises:

receiving a selection of the selectable feature corresponding to the second item by the at least one computer processor; and wherein causing the display of the second record after the expanded first record and prior to the second plurality of records comprises:

inserting the second record into the ordered stream immediately following the expanded first record by the at least one computer processor, wherein the second record comprises the identifier of the second item and at least one of:

an image of the second item;

a price of the second item; or a selectable feature for initiating or executing a purchase of the second item.

11. The computer-implemented method of claim 5, further comprising:

in response to the selection of at least the portion of the first record, identifying a second plurality of records by the at least one computer processor, wherein each of the second plurality of records is one of the first plurality of records, and wherein each of the second plurality of records follows the first record within the ordered stream;

modifying an order of the second plurality of records based at least in part on the at least one attribute of the first item by the at least one computer processor; and causing a display of at least the second record following the expanded first record within the ordered stream by the at least one computer processor, wherein the second record is a first one of the second plurality of records according to the modified order.

12. The computer-implemented method of claim 5, further comprising:
in response to the selection of at least the portion of the first record,
identifying a second plurality of records by the at least one computer processor, wherein each of the second plurality of records is one of the first plurality of records, and wherein each of the second plurality of records follows the first record within the ordered stream;
identifying a third plurality of records based at least in part on the search query and the at least one attribute of the first item by the at least one computer processor;
removing each of the second plurality of records from the ordered stream by the at least one computer processor;
determining an order of the third plurality of records based at least in part on the at least one attribute of the first item by the at least one computer processor; and
causing a display of at least the second record following the expanded first record within the ordered stream by the at least one computer processor, wherein the second record is a first one of the third plurality of records according to the order.

13. A non-transitory computer-readable medium having computer-executable instructions stored thereon,
wherein the instructions, when executed, cause a computer system having at least one computer processor to perform a method comprising:
receiving a search query from a mobile device over a network;
identifying a plurality of search results pertaining to the search query, wherein each of the plurality of search results relates to one of a first plurality of items;
transferring data for causing a display of a list of a plurality of records on a touchscreen display of the mobile device over the network, wherein each of the records comprises information regarding one of the plurality of search results;
receiving data regarding a first interaction with a first record in the list on the touchscreen display over the network, wherein the first record comprises first information regarding a first search result over the network;
identifying second information regarding the first search result in response to the first interaction;
determining at least one attribute of the first search result;
identifying a second plurality of items based at least in part on the at least one attribute;
identifying third information regarding at least one of the second plurality of items;
transferring data for expanding the first record to include at least some of the second information regarding the first search result and at least some of the third information regarding at least one of the second plurality of items over the network;
receiving data regarding a second interaction with at least some of the third information within the expanded first record;
identifying a portion of the plurality of records following the first record in the list;

modifying an order of the portion of the plurality of records following the first record in the list based at least in part on the at least one attribute of the first search results, wherein a second record comprising at least some of the third information is first in the modified order; and
transferring data for causing the portion of the plurality of records following the first record to be displayed according to the modified order over the network, wherein the second record is displayed immediately following the first record.

14. The non-transitory computer-readable medium of claim 13, wherein the at least some of the third information identifies at least a second item related to the first item,
wherein the second item is the at least one of the second plurality of items, and
wherein the method further comprises:
receiving data regarding a second interaction with the at least some of the third information on the touchscreen display over the network; and
identifying fourth information regarding the second item, wherein the second record comprises at least some of the fourth information regarding the second item.

15. The non-transitory computer-readable medium of claim 14, wherein the second interaction with the at least some of the second information on the touchscreen display relates to a request to purchase the first item, and
wherein the second item is a complement to the first item.

16. The non-transitory computer-readable medium of claim 14, wherein the second interaction with the at least some of the second information on the touchscreen display relates to a request to view information regarding the first item, and
wherein the second item is a substitute for the first item.

17. The mobile computing system of claim 1, wherein the user interface has a first width,
wherein each of the first record and the second record has the first width and a first length within the user interface,
wherein the expanded first record has the first width and a second length within the user interface, and
wherein the second length is greater than the first length.

18. The computer-implemented method of claim 5, wherein the user interface has a first width,
wherein each of the first plurality of records has the first width, and
wherein expanding the first record in the at least one direction within the ordered stream comprises:
increasing a length of the first record within the ordered stream,
wherein the expanded first record has the first width.

19. The non-transitory computer-readable medium of claim 13, wherein the method further comprises:
receiving data regarding a third interaction with at least a portion of the touchscreen display over the network, wherein the third interaction is an upward scroll of at least a portion of the list on the touchscreen display, and
wherein the data for causing the portion of the plurality of records following the first records to be displayed according to the modified order is transferred over the network in response to receiving the data regarding the third interaction.

* * * * *